Nov. 27, 1956 W. R. BAILEY 2,771,897
CONTROLLER HAVING AN OUTPUT PROPORTIONAL
TO THE PRODUCT OF TWO INPUTS
Filed May 27, 1953 4 Sheets-Sheet 1
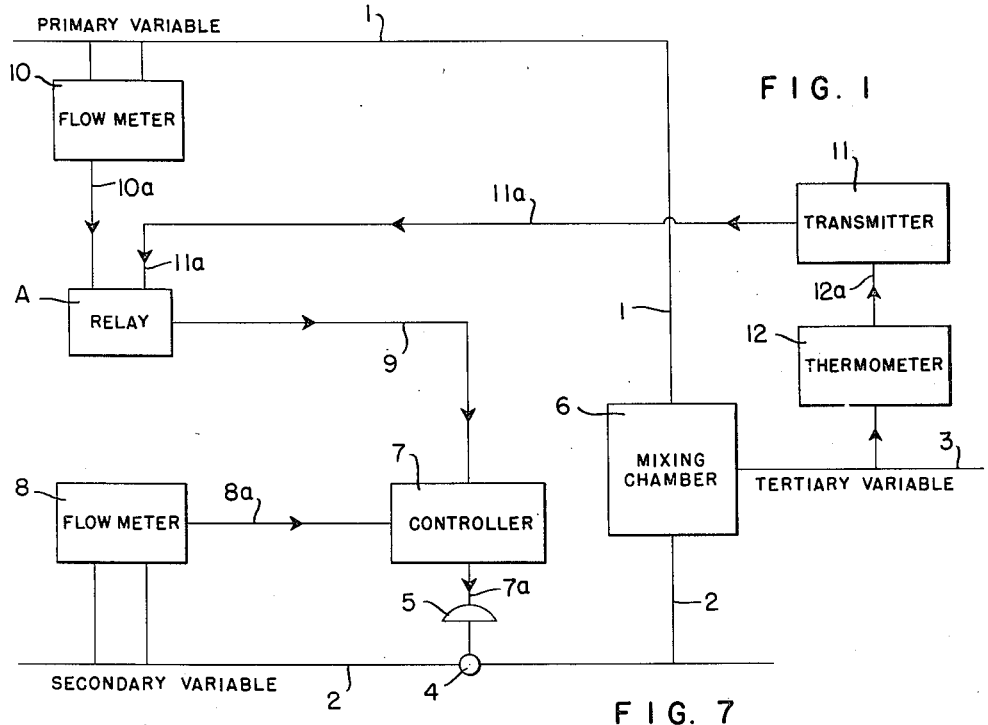
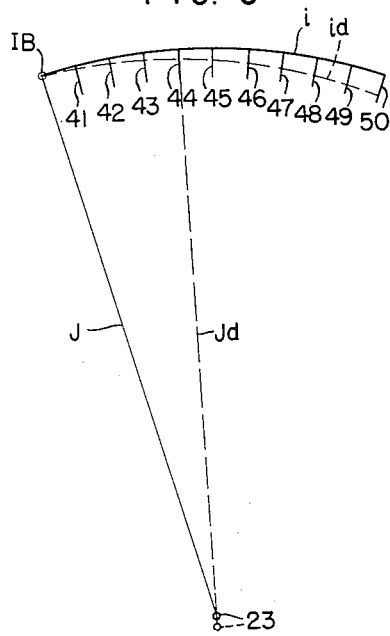
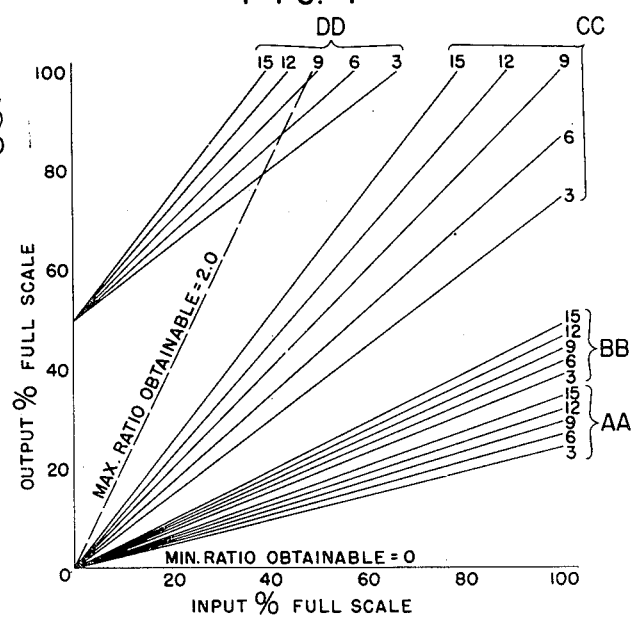
INVENTOR.
WILLIAM R. BAILEY
BY Arthur H. Swanson
ATTORNEY.

INVENTOR.
WILLIAM R. BAILEY

ATTORNEY.

Nov. 27, 1956   W. R. BAILEY   2,771,897
CONTROLLER HAVING AN OUTPUT PROPORTIONAL
TO THE PRODUCT OF TWO INPUTS
Filed May 27, 1953   4 Sheets-Sheet 3

INVENTOR.
WILLIAM R. BAILEY
BY
Arthur H. Swanson
ATTORNEY.

INVENTOR.
WILLIAM R. BAILEY

United States Patent Office 2,771,897
Patented Nov. 27, 1956

2,771,897

CONTROLLER HAVING AN OUTPUT PROPORTIONAL TO THE PRODUCT OF TWO INPUTS

William R. Bailey, Philadelphia, Pa., assignor to Minneapolis-Honeywell Regulator Company, Minneapolis, Minn., a corporation of Delaware Application May 27, 1953, Serial No. 357,871

14 Claims. (Cl. 137—85)

The general object of the present invention is to provide an improved cascade control system operative to control the proportioning of process variables. More specifically, the general object of the invention is to provide a pneumatic, variable-ratio, relay or multiplier apparatus and method operative to produce an output pressure proportional to the product of two input pressures.

A major object of the invention is to provide a pneumatically-set, adjustable-ratio method and apparatus adapted for use as an integral component of a cascade ratio control system, and operative to receive two input fluid pressures and to continuously and automatically adjust their relationship as required to maintain a controlled output pressure which is proportional to the product obtained by multiplying one of the input pressures by the other.

My novel control system is adapted for many uses. Thus, it is noted by way of illustration and example, that the invention may be used in the operation of a distillation column to maintain the steam and alcohol vapor ratio required to obtain a constant proof product; and in the operation of multiple effect evaporators to hold density or other characteristic of sugar or orange juice or analogous products, within desired limits by controlling the ratio of steam to feed delivered to the first effect; and in chemical processes to proportion two solutions to obtain a final product having a desired pH value; and to obtain a desired HCL concentration by controlling the ratio of the contacting water and hydrogen chloride gas; and in testing jet engines by remote control use of graphic panels to maintain a desired ratio of the absolute pressures of an up stream to a down stream of high velocity and supersonic gases; and, as is hereinafter illustrated and described by way of example, the invention may be used to maintain a constant fluid temperature in a mixture of relatively hot and cold liquids, each of which may vary in temperature and in rate of flow.

The various features of novelty which characterize my invention are pointed out with particularity in the claims annexed to and forming a part of this specification. For a better understanding of the invention, however, its advantages, and specific objects attained with its use, reference should be had to the accompanying drawings and descriptive matter in which I have illustrated and described preferred embodiments of the invention.

Of the drawings:

Fig. 1 is a schematic view diagrammatically illustrating an embodiment of the invention;

Fig. 6 is a diagram showing joint effects of changes in input and ratio-set bellows pressures; and Fig. 7 is a graph showing effects of calibration adjustments.

Figure 2:
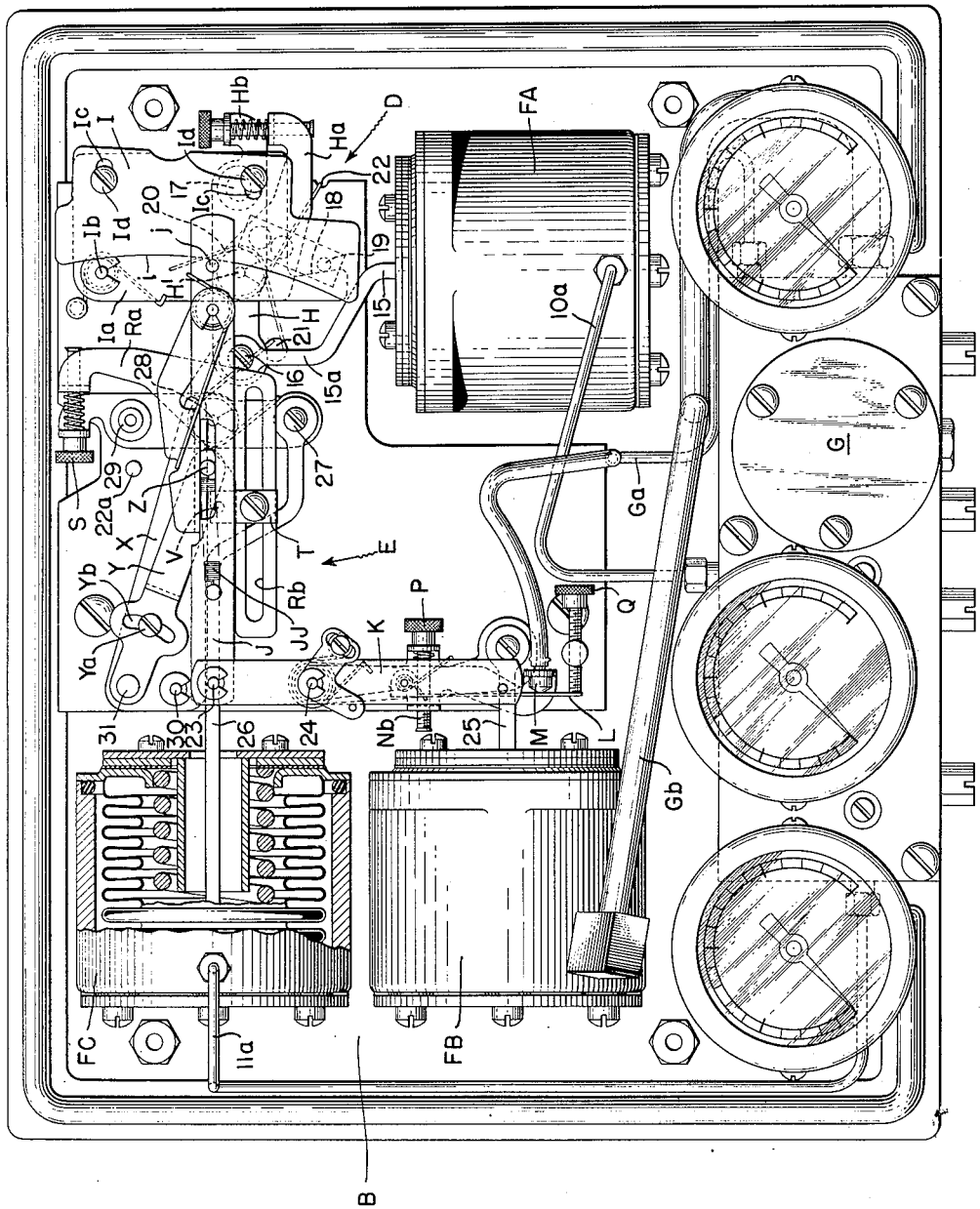
Fig. 2 is an elevation of a pneumatic-set ratio relay with its front casing wall removed to show the general arrangement of major elements of the relay.

In the block diagram shown in Fig. 1, I have schematically illustrated the use of the present invention in continuously blending or mixing a relatively cold primary fluid stream flowing through an input conduit 1 with a relatively hot secondary or controlled fluid stream flowing through an input conduit 2 to form a tertiary fluid stream mixture flowing through an output conduit 3 and having a regulated temperature. The flow of the secondary or controlled stream is regulated by a throttling valve 4 adjusted by an expansible pressure chamber 5 as required to maintain a desired output fluid temperature in the conduit 3.

In some cases, the conduits 1 and 2 may advantageously be connected to the conduit 3 through a mixing chamber 6, but the use of such a mixing chamber may be objectionable in other cases. The pressure in the chamber 5 is directly controlled by a pneumatic signal transmitted from a controller 7 to the chamber 5 through a conduit 7a. A flow meter 8 transmits a pneumatic signal, varying with the rate of flow through the conduit 2 to the controller 7 through a conduit 8a. The effect of the signal transmitted to the controller 7 by the conduit 8a on the signal which the controller 7 transmits to the chamber 5, is regulated and modified by the pneumatic signal transmitted to the controller 7 through the conduit 9 from an adjustable-ratio relay A.

The relay A is jointly responsive to effects produced by two pneumatic signals. One of those signals is transmitted to the relay A through a conduit 10a by a flow meter 10 measuring the flow through the conduit 1. The second signal is transmitted to the relay A through the conduit 11a from a temperature transmitting and control element 11. A pneumatic signal varying with the temperature of the fluid flowing in the conduit 3, is impressed on the control element 11 through the conduit 12a by a thermometer bulb 12 or other device which measures the temperature of the fluid flowing through the conduit 3. The rate of flow through the conduit 2 is varied by the valve 4 to maintain the desired temperature in the conduit 3 as is hereinafter explained. The relay A is an adjustable-ratio relay, which develops and transmits through the conduit 9 a pneumatic output signal proportional to the product of the two pneumatic signals transmitted to the relay A through conduits 10a and 11a.

Figure 3:
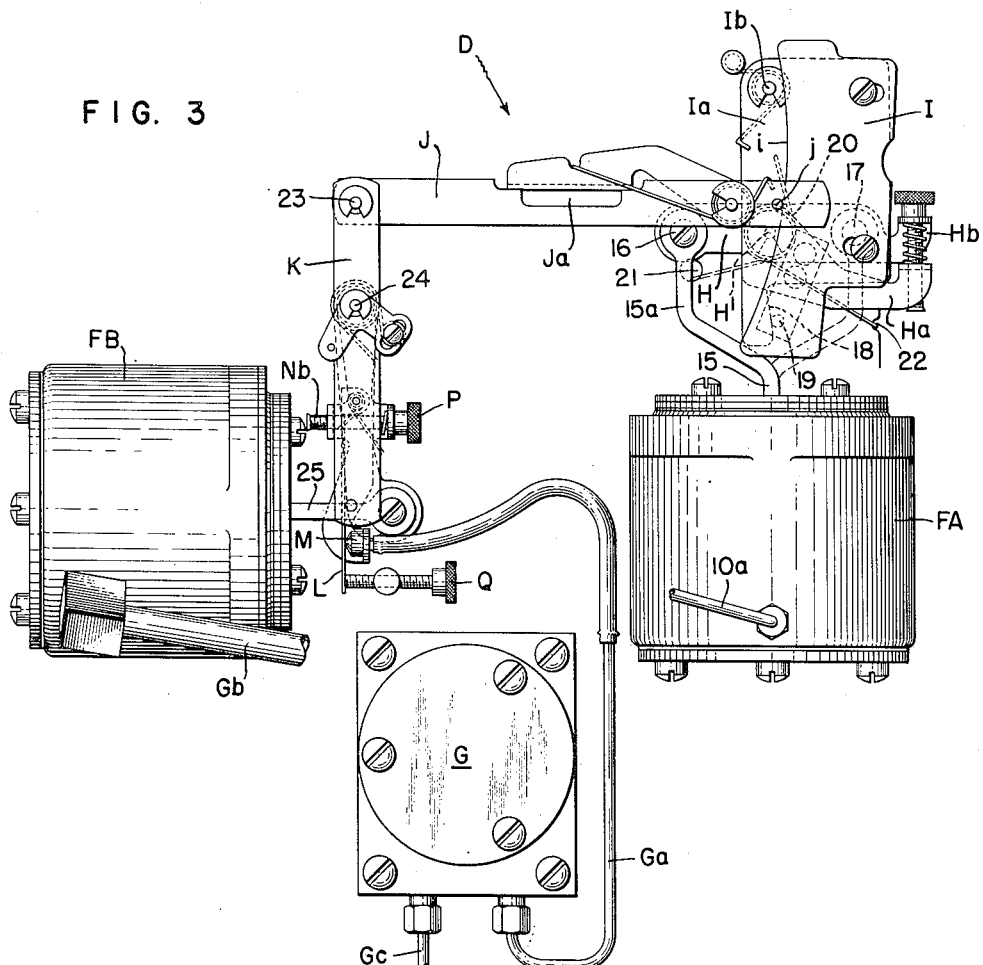
Fig. 3 is a front elevation illustrating the relay linkage of ratio relay apparatus shown in Figs. 2 to 5.
Figure 4:
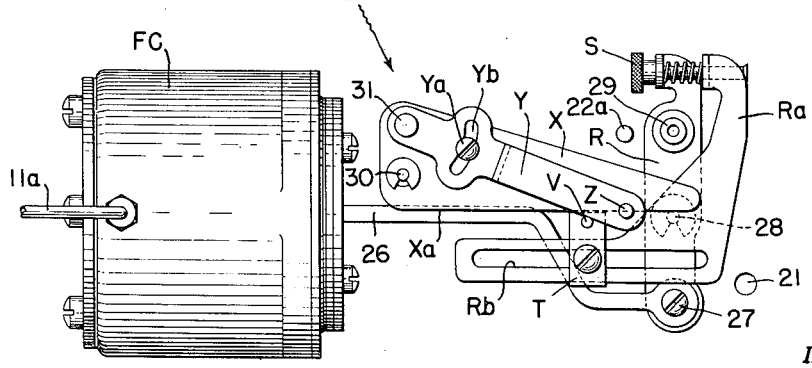
Fig. 4 is a front elevation of the ratio-setting linkage of the ratio relay apparatus shown in Fig. 2.

Figs. 2 to 7 illustrate the structure and operation of an instrument devised by me for use in the practice of the present invention. That instrument comprises a base plate B on which instrument mechanism is mounted, and a cover, not shown, detachably connected to the base B and serving in conjunction with the latter to enclose the instrument mechanism. Major elements of the apparatus shown in Figs. 2 to 5 comprise: an input bellows FA; an output bellows FB; a pilot valve G; relaying linkage mechanism D, which, in Fig. 3, is shown detached from associated mechanism shown in other figures; a ratio-bellows FC; and a ratio-setting linkage E, which, in Fig. 4, is shown detached from associated instrument mechanism shown in other figures. The apparatus shown in Fig. 2 also includes output, input, and ratio-set pressure gauges. The input bellows FA and FC may, and are assumed to, correspond to the elements of the relay A which receive pneumatic signals through the Fig. 1 conduits 10a and 11a, respectively, and the output bellows FB and pilot valve G may, and are assumed to, correspond to elements included in the relay A for transmitting a pneumatic control signal through the Fig. 1 conduit 9 to the controller 7.

The element H included in the mechanism E (shown best in Fig. 3) is a bell crank lever pivoted to turn about a fixed pivot H', which is transverse to and intersected by the axis of the bellows FA. The latter has its base transverse to and supported by the base plate B. As shown, the body portion of the lever H is a bar-like body part mounted on the pivot H' to turn through a small angle in each direction relative to the input bellows FA. The lever H also includes an arm portion Ha journaled on the pivot H' and extending away from the latter toward the bellows FA. The element Ha may be adjusted angularly about the pivot H', relative to the lever body H, by means shown as comprising an adjusting screw Hb. The latter has one end swivel-connected to the lever body H and has its other end in threaded engagement with a lateral extension of the arm Ha. Thus the rotation of the screw Hb angularly adjusts the lever part Ha relative to the lever part H about the pivot H'.

The bellows FA has an end wall movable toward and away from the pivot H'. Said end wall is normally connected to the bell crank H by a push rod or stem 15. The latter has an inner end portion coaxial with and connected to the movable end wall of the bellows FA, and has an outer end portion 15a parallel to but laterally displaced from the axis of the bellows FA. The stem outer end portion 15a is shown in Fig. 3 as connected by a pivot 16 to the lower end of the part H for direct action. However, by rotating the stem portion 15 about the axis of its inner end portion through an angle of 180°, the outer end portion 15a of the stem may be moved into the reverse-action position shown in dotted lines in Fig. 3. In that position, the stem portion 15a is connected to the upper end of the member H by a pivot 17. When so connected for reverse-action, the push rod 15 operates on an expansion of the bellows element FA to turn the bell crank H counter-clockwise about the pivot H', as seen in Fig. 3. When the stem portion 15a is connected by the pivot 16 to the lower end of the member H for direct-action, as is usual, the expansion of the bellows FA turns the bell crank H in the clockwise direction, as seen in Fig. 3.

Parallel spaced apart plates I and Ia rigidly connected to one another, form an arc plate assembly having one end pivotally mounted on a fixed pivot Ib. The pivot Ib is parallel to the pivot H'. The end of the plate Ia remote from the pivot Ib is formed with a shoulder 18 engaged by a plate positioning pin 19 carried by the arm Ha of the bell crank H. Said arc plate assembly is spring biased to turn about the pivot Ib in the counter-clockwise direction as seen in Fig. 3, so that the shoulder 18 is held in engagement with the pin 19 at all times. Thus, movement of the pin 19, clockwise or counter-clockwise about the pivot H', causes the arc plate assembly to turn clockwise or counter-clockwise, respectively, about the pivot Ib. A torsion bias spring 20 wound around the pivot H', has one end bearing against the upper arm of the bell crank part H. The other end of the spring 20 is inserted in a hole 21 or in a notch 22 in the apparatus frame work, accordingly as the expansion of the bellows FA tends to turn the bell crank H in the clockwise or counter-clockwise direction, respectively, as seen in Fig. 3. When one end of the spring is inserted in the frame work hole 21, the bias spring 20 tends to compress the bellows FA and thus tends to minimize lost motion and maintain the push rod 15 in its proper position during reverse-action. When the push rod is connected to the pivot 16 for direct-action, the operative effect of the bias spring 20 is not required and the second end of that spring may then be inserted or parked in the notch 22. The arc plate I is formed with a concave edge i in the form of a circular arc which is tangent to the location of pin j when the axis of pin j is aligned with the axis of pivot Ib. Plate I has slots Ic in it through which screws Id extend. The screws Id can be loosened, so that plate I can be adjusted until the concave edge i is in the desired location. Screws Id are then tightened to retain plates I and Ia rigidly connected.

The edge i is engaged by a pin j carried by the end of a strut or thrust member J. Strut J is biased by coiled spring JJ so that pin j is always in yielding engagement with curved edge i. Strut J has bifurcated end portions which straddle the plate I, and has its lower end connected by a pivot 23 to one end of a lever K. The latter is journaled intermediate its ends on a fixed pivot 24. The pivots 23 and 24 are parallel to the pivots H' and Ib. A flapper valve L is mounted on the second end of the lever K with its free end extending away from the lever in the general direction of the length of said lever. The strut J is biased to maintain a light contact pressure between its end and the curved edge i of the plate I. The strut J acts as a ratio-selector arm which is moved to give a counter-clockwise movement to the lever K on a pressure increase in the input bellows FA. That pressure increase gives the plate I and its curved edge i, a clockwise movement about the pivot Ib, as seen in Fig. 3.

The counter-clockwise movement thus given to the lever K moves the flapper valve L, supported by the lever K, toward the bleed nozzle M and thereby increasingly throttles the discharge orifice of the nozzle M. The bleed nozzle M receives air under pressure through a flexible pipe Ga from the pilot valve G which is of the non-bleed type. The described increase in the throttling effect of the flapper valve L increases the air pressure in the nozzle M and in a pipe Gb, through which air under pressure is passed from the pilot valve G to the input of the bellows FB. Air under the approximately constant pressure of 20 p. s. i., may be supplied to the pilot valve through a pipe Gc. The bleed nozzle M is carried by one end of a lever N which has its other end journaled on the pivot 24.

The expansion and contraction of the bellows FB gives the nozzle M movements respectively away from and toward the flapper valve L. The means shown for giving the nozzle M said movements includes an adjustable connection between the lever N and the upper end of the stem 25 of the bellows FB. Said adjustable connection may take various forms. As shown diagrammatically in Fig. 5, the lever N and a second lever Na each have one end journaled on the pivot 24. The upper end of the stem 25 is pivotally connected to the second end of an arm Na and a portion of the lever Na adjacent its connection to the stem 25 is connected to the lever N by a threaded adjusting element Nb. The element Nb normally holds the part Na and lever N in fixed relation to one another, but may be adjusted to vary said relation. As those skilled in the art will understand, the nozzle M will closely follow the movements of the flapper valve L. In practice, the maximum difference in the distance in either direction between the flapper valve L and nozzle M will ordinarily not exceed .002". The movement of the flapper valve L towards the nozzle M throttles and increases the pressure in the discharge orifice of the nozzle M. The resultant increase in the nozzle back pressure is amplified by the non-bleed pilot valve G and fed back to the output bellows FB. This feed back causes the output bellows to force the nozzle M away from the flapper valve L, thus rebalancing the flapper and nozzle couple, and establishing a new pressure output level. The output level for any input can be zero-adjusted through a plus or minus fifty percent of the full scale movement of the bellows stem 25 by an appropriate adjustment of the threaded adjustment element Nb.

The bleeding of air to the atmosphere through the nozzle M as described, results in the maintenance of a control pressure which is transmitted to the output bellows FB by the pipe Gb and may be transmitted through a pipe Gd to other control apparatus. The pilot valve G, of known non-bleed type, is preferably adapted for maximum speed response. To that end, the pilot valve is formed with unusually large air passages, and all moving parts are made as light as possible to provide high sensitivity. Suitable provisions are advantageously made for cleaning the pilot valve, and particularly its capillary-tube air restriction and air filter.

The ratio-setting mechanism E, shown best in Fig. 4, comprises a pneumatic receiver, and has three special characteristics; namely, it is reversible; it has very wide adjustability in its zero; and it has very wide adjustability in its span. The ratio-setting bellows FC has its movable end wall connected to a push rod or stem 26 similar in form to the stem 15 of the bellows FA shown in Fig. 3. The stem 26 is shown in Fig. 4 as operatively connected by a screw pivot 27 to the right hand end of the body portion of a bell crank lever R mounted on a fixed pivot 28 to adapt the mechanism E for direct-action. For reverse-action, the pivot 27 is removed from its position shown in Fig. 4 and is inserted in the threaded opening 29 in the bell crank R, which is on the opposite side of the fixed pivot 28 from the pivot 27, as shown in Fig. 4. The bell crank lever R includes a part Ra journaled on the pivot 28 and having its left end, as seen in Fig. 4, connected to the adjacent end of the body portion of the lever R by an adjusting screw S. For direct-action, an auxiliary torsion spring must be used in the general manner in which it is used for reverse-action with the bell crank H of Fig. 3. The torsion spring, which is not shown in Fig 4, normally has one end anchored in the hole 21, shown alike in Fig. 3 and in Fig. 4. That end of the torsion spring is transferred from the hole 21 to the hole 22a for reverse-action operation of the mechanism E.

In direct-action operation, the expansion of the bellows FC tilts the element R in the counter-clockwise direction about the pivot 28 and thereby gives a counter-clockwise adjustment to the portion of the member Ra including the slot Rb. The latter is shown in Fig. 4 as parallel to the axis of the bellows element FC, but when the element Ra is turned counter-clockwise about the pivot 28, the slot Rb is inclined to the bellows axis and its lower end is further displaced from said axis. Mounted in and adjustable along the length of the slot Rb, is a slider T normally clamped to the member Ra by a screw U. The slider T carries a pin V. The pin V serves as an adjustable stop which limits movement in the counter-clockwise direction of a plate-like member X. The latter has its lower end portion journaled on a pivot 30 parallel to the pivot 28 and pin V, and is biased by gravity or other means, for clockwise movement, as seen in Fig. 4, about the pivot 30.

Figure 5:
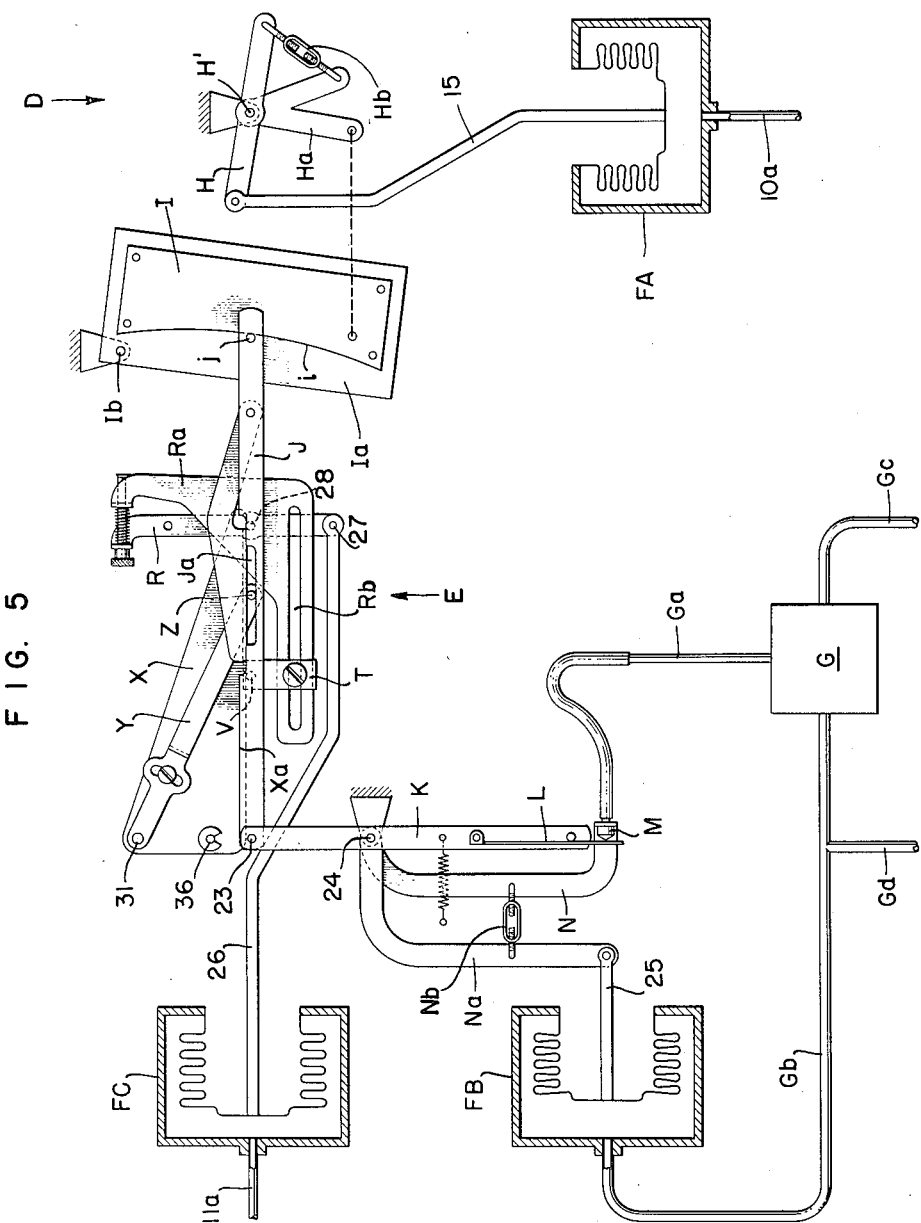
Fig. 5 is a view schematically illustrating operative relations of linkage and bellows elements shown in Figs. 2–4.

Mounted on the plate X is an arm Y. The latter is connected to the plate X by a pivot 31 and may be clamped to the plate X in different angular relations by a clamping screw Ya which extends through a slot Yb in the member Y. The pin V serves as a stop to arrest movement of the plate X in the clockwise direction about the pivot 30 when engaged by the edge of the plate. The arm Y forms a normally fixed but adjustable portion of the plate X and carries a pin Z. The pin Z extends through the slot Ja in the member J shown in Fig. 3, and thereby angularly adjusts the mmeber J about its supporting pivot 23, on and in accordance with the angular adjustments of the plate X and arm Y. As Fig. 4 makes apparent, the plate X, when in its zero position, has its edge Xa alongside a plane intersecting the axis of the bellows FC and transverse to the plate X. The adjustment of the arm Y relative to the plate X is such that the pin Z holds the member J in a position intermediate the ends of the curved edge i, as shown in Figs. 3 and 5. When the plate X occupies its zero position, the position of the pin Z determines the ratio-zero for which the apparatus is adjusted. With the adjustment of the parts as schematically shown in Fig. 5, the pin j is midway between the ends of the curved edge i. This means that the apparatus is then adjusted so that the ratio has a value corresponding to the position at 50% of the length of the edge i. Adjustment of the member Y relative to the member X in the clockwise or counter-clockwise direction, respectively, will increase or decrease the ratio-zero of the apparatus. When the relative adjustment of the members X and Y permits the movement of the pin j into register with the pivot Ib, the ratio-zero becomes zero.

While the adjustment of the arm Y relative to the zero position of the plate X determines the ratio-zero of the apparatus, the ratio range of the apparatus depends both on the span of adjustment permitted the pin V and on the ratio-zero adjustment of the pin Z. The ratio-span is fixed by and is proportional to the maximum range of movement of the pin j as the pressure in the ratio-set bellows FC varies between its effective minimum and maximum values, which may be and are assumed herein to be 3 pounds per square inch (p. s. i.) and 15 p. s. i., respectively. More specifically stated, the ratio-span is proportional to the arc of movement of the pin j. At the end of that arc, the pin j will be in register with the pivot Ib or will be displaced from said pivot, depending on the ratio-zero adjustment of the arm Y. The other extremity of said arc of movement may be at the end of the edge i remote from the pivot Ib or at some point nearer to the latter, depending on the adjustment of the slider contact T along the slot Rb. As will be apparent, the magnitude of the ratio-span is increased and decreased by moving the slider T respectively away from or toward the end of the slot Rb adjacent the lever R. An adjustment of the ratio-span ordinarily causes a shift in the ratio-zero, but a ratio-zero adjustment does not affect the ratio-span.

The mechanisms shown by Figs. 3 and 4 are well adapted to operate for their intended purposes of producing a pneumatic, variable-ratio relay, or multiplier mechanism which is operative to produce an output pressure proportional to the product of two input pressures. Thus, for example, when the apparatus collectively shown in Figs. 2 to 5 is used for the blending purpose diagrammatically illustrated in Fig. 1, the pneumatic output pressure of the flow meter 10 of Fig. 1 will be transmitted to the bellows chamber FA, and the pneumatic output pressure of the tertiary controller or regulator 11 will be transmitted to the bellows FC. The extent of movement given to the movable end wall of each of the bellows chambers FA and FC, on a given change in the pressure transmitted to that chamber, may vary in magnitude with the design of the apparatus, and in particular with variations in the loading force which yieldingly opposes the expanding pressure within each chamber. However, regardless of the magnitude of the bellows expansion produced by a given change in the pressure within either bellows FA or FC, each of those bellows must be adapted to expand in a predetermined approximately linear proportion to the changes in the pressure within the bellows.

With the apparatus shown in Fig. 3, an increase or decrease in the pressure in the bellows FA results in an angular adjustment of the arc assembly plate, clockwise or counterclockwise, respectively, about the pivot Ib, and proportional in magnitude to the change in the pressure in the bellows FA. Similarly, an increase or decrease in the pressure of the bellows FC results in an adjustment of the adjacent end of the strut J along the curved edge i of the plate I, respectively away from or toward the pivot Ib.

In practice, the strut J is lightly biased for continuous contact with the curved edge i of the plate I, and is given longitudinal adjustments, as hereinafter described, which vary the position of the flapper valve L and thereby control the output pressure of the pilot valve G and thus determines the operative effects of the apparatus illustrated and described herein. An understanding of the longitudinal adjustments of the member J, the manner in which they are produced, and their effects on the position of the flapper valve L, may be facilitated by defining what may be termed the respective zero positions of the edge $i$ of the plate I, of the pivot 23, and of the member J. The zero position of the plate I is that in which the end of the member J can move along and in contact with the edge $i$ from one end to the other of that edge without moving the pivot 23 or angularly adjusting its supporting lever K. The position then occupied by the pivot 23, is the zero position of the latter. The zero position of the member J is that in which the member J extends radially away from the axis of the pivot I$b$. In practice, the plate I is held in its zero position when the pressure in the input bellows FA does not exceed its minimum operative value. In accordance with the customary practice of the air controller art, the minimum operative pressure in the bellows FA is ordinarily about 3 p. s. i.

So long as the plate I with its curved edge $i$, and the member J occupy their respective zero positions, the pivot 23 will occupy its zero position. Furthermore, the pivot 23 will occupy its zero position as long as the member J remains in its zero position, notwithstanding a displacement of the edge $i$ from its zero position. When the edge $i$ and the member J are each displaced from their respective zero positions, the pivot 23 will be displaced from its zero position by an amount proportional to the displacement of the edge $i$ from its zero position multiplied by the displacement of the member J from its zero position, as may readily be demonstrated mathematically. Such demonstration is unnecessary herein. Moreover, the multiplication of the two displacements is made clearly apparent by the simple diagram shown in Fig. 6.

In that diagram, the zero positions of the curved edge $i$, pivot 23 and member J are shown in full lines, and the curved edge $i$ and member J are shown by dotted lines $id$ and $Jd$ in positions displaced from their respective zero positions, and the pivot 23 is shown in dotted lines in the position into which it is moved as a result of the displacement of the edge $i$ and member J to their respective dotted line positions.

For illustrative purposes, the full line curved edge $i$ of Fig. 6 is intersected by transverse spaced apart index lines 41–50 with the distance between each two adjacent lines equal to one-tenth of the length of the curved edge $i$. The displaced position of the member J is shown by the dotted line $Jd$ as extending radially from an intermediate point of the curved edge $i$ to the displaced position of the pivot 23.

As shown in Fig. 6, progressive movement of the upper end of the member J to the right from the full line position of the member in which the latter extends radially away from the pivot I$b$, progressively lowers the pivot 23 by substantially equal increments as the upper end of the member J successively cross the lines 41, 42, etc. As the member J moves to the right from the position in which it is in alignment with any one of the lines 41, 42, etc., into engagement with the adjacent line, the pivot 23 is lowered by an amount approximately equal to one-tenth of the distance between the full line position of the pivot 23, and the position which that pivot will occupy when the member J is moved into register with the line 50. Thus as the arm H moves to the right along the dotted line $id$, it "picks off" an increasing proportion of the input signal which corresponds to the maximum displacement of the dotted line $id$ from the full line curve $i$ of Fig. 6. With the member J occupying the position indicated by the dotted line $Jd$ in Fig. 6, the displacement of the pivot 23 from its zero position is obviously twice as great as it was when the member J was in register with the line 42, and is half as great as it would be if the line $Jd$ were in register with the index line 48.

Theoretically, the length of the portions of the lines 41, 42–50 between their points of intersection with the curves $i$ and $id$ of Fig. 6, do not progressively increase in truly linear proportion as the angle between the full line J and the dotted line $Jd$ progressively increases. However, with the small angular distance between the axis of the pivot I$b$ and the point on the line $i$ intersected by the index line 50, the progressive increases in the lengths of the portions of the index lines 41–50 are sufficiently linear for practical operation.

As has been previously explained, the ratio-zero adjustment is effected with the apparatus shown in Fig. 4, by the angular adjustment of the arm Y relative to the plate X, and the ratio-span adjustment is effected by moving the slider T longitudinally along the slot R$b$. Fig. 7 illustrates the maximum and minimum ratios, and the maximum ratio-span, attainable with the apparatus shown. Curves within those limits are shown in Fig. 7 for differently adjusted relays (or different relay adjustments), AA, BB, and CC. The curves AA are for a relay adjusted for a ratio-range of 0.25 to 0.35. The curves BB are for a relay adjusted for the same ratio-span as AA, namely, 0.1, but with a different ratio-zero, shifting the range to 0.4 to 0.5. The curves CC are for a relay adjusted for the wider ratio-span of 0.5, and with the ratio-zero shifted to provide pneumatic selection between 0.75 and 1.25. The curves DD of Fig. 7 are for a relay having the same ratio-set calibration as the relay for which the curves CC are used, and having a ratio-range of 0.75 to 1.25, but with the output zero shifted plus fifty percent, i. e., to an effective minimum output pressure of 9 p. s. i. instead of the usual 3 p. s. i. The numerals at the end of each of the different curves AA, BB, CC, and DD, indicate the p. s. i. required to cause a relaying action to occur along that line of ratio.

While, in accordance with the provisions of the statutes, I have illustrated and described the best forms of embodiment of my invention now known to me, it will be apparent to those skilled in the art that changes may be made in the forms of the apparatus disclosed without departing from the spirit of my invention as set forth in the appended claims and that in some cases certain features of my invention may be used to advantage without a corresponding use of other features.

Having now described my invention, what I claim as new and desire to secure by Letters Patent is as follows:

1. A relay, including, a member pivoted to turn about a normally stationary first axis and having an arc-shaped surface intersecting said axis, parallel to a second axis displaced from the first mentioned axis, a strut pivoted to turn about said second axis extending between said second axis and said arc-shaped surface, said relay being operable, when said strut is angularly displaced from said first axis to move said second axis away from the initial position of said arc-shaped surface a distance proportional to the product of the angular displacement of said strut from said first axis and the angular adjustment of said member about said first axis from its initial position.

2. An adjustable pneumatically-set ratio relay mechanism comprising, in combination, first means for receiving a first pneumatic pressure proportional to one variable, second means for receiving a second pneumatic pressure proportional to a second variable, a pivoted member moved by said first means to turn about a normally stationary first axis and having an arc-shaped surface, a second axis displaced from the first mentioned axis, an element pivoted to turn about the second axis and having its end remote from the second axis in engagement with said arc-shaped surface and moved by said second means along said arc-shaped surface to thereby displace said second axis from its initial position, and means responsive to said movements of said member and of said element for creating a third pneumatic pressure proportional to the product of said first and second pressures, the constant of said proportionality being adjustable to a predetermined value.

3. A relay mechanism including a member arranged to turn about a stationary axis out of and back into a first position and having an arc-shaped edge intersecting said axis and displaced from a second axis movable away from an initial position along a line substantially radial to said edge, an element extending radially away from said second axis and having its end remote from that axis in engagement with said edge and movable along the latter as said element is adjusted angularly about said second axis to thereby displace said second axis from its initial position by a distance proportional to the angular displacement of said member from its first position multiplied by the extent of the angular displacement of said element from said first axis.

4. A relay mechanism as specified in claim 3, including control means responsive to the extent of displacement of said second axis from its initial position.

5. A relay mechanism as specified in claim 3, including means responsive to a control condition for moving said member away from its first position for a distance dependent on the magnitude of said condition, and means responsive to variations in a second condition for angularly adjusting said element about said second axis in accordance with the magnitude of said second condition.

6. A relay mechanism as specified in claim 3, including means responsive to variations in a fluid pressure for adjusting said member away from and back toward said first position on increases and decreases respectively in said fluid pressure, and means responsive to variations in a second fluid pressure for adjusting said element along said edge in accordance with the magnitude and direction of the last mentioned variations.

7. A relay mechanism as specified in claim 3, including fluid pressure control means actuated on and in accordance with the displacement of said second axis from its initial position, comprising, a pilot valve having a fluid pressure inlet and an adjustable bleed nozzle, a flapper valve, means for moving said flapper valve toward and away from said bleed nozzle, respectively, as said second axis moves away from and back toward said initial position, and means responsive to variations in the bleed nozzle pressure for giving feed back movements to said nozzle.

8. A relay mechanism as specified in claim 3, including means operable to maintain a predetermined minimum displacement of said element from said first axis.

9. A relay mechanism as specified in claim 8 including means for maintaining a maximum displacement of said element from said first axis.

10. A relay mechanism as specified in claim 3, including adjustable means for maintaining a maximum displacement of said element from said first axis.

11. A relay mechanism, comprising in combination, a member pivoted to turn about a normally stationary first axis out of and back into a zero position and having an arc-shaped edge intersecting said axis, a second axis displaced from said edge, an element extending radially away from said second axis and having its end remote from that axis in engagement with and movable along said edge away from and toward said first axis, whereby, when the remote end of said element is displaced from said first axis and said egde is displaced toward said second axis from its zero position, said element increases the displacement of said second axis from the zero position of said edge by a distance proportional to the displacement of said edge from its zero position multiplied by the displacement of said remote end of said element from said first axis.

12. Apparatus for producing an effect proportional to the product of first and second variable pneumatic pressures, comprising in combination, a member pivoted to oscillate about a normally stationary first axis, an element pivoted to oscillate about a second axis and engaging said member at a distance from said second axis, means subjecting said member to a deflecting force proportional to said first pressure and adapted to turn said member about said axis in a direction to engage said element and for a distance proportional to said deflecting force, and means actuated by said second pressure for positioning the engaging part of said element at a distance from said first axis proportional to the magnitude of said second pneumatic pressure.

13. A control mechanism, comprising, a member pivoted to turn about a normally stationary axis and formed with an elongated surface extending away from said axis, means responsive to a first controlling condition for oscillating said member about said axis, a strut having one end in engagement with said surface and extending away from the latter, a lever pivotally connected to the second end of said strut, a flapper valve carried by said lever, a pilot valve having an inlet for fluid supplied under pressure and a bleed nozzle cooperating with said flapper valve to establish a control pressure, means actuated by said control pressure to effect follow-up adjustments of said nozzle following variations in said control pressure, and means responsive to a second controlling condition for moving said strut toward and away from said axis as the last mentioned condition varies.

14. A control mechanism as specified in claim 13, in which the means responsive to said second controlling condition includes adjustment means for regulating the minimum and maximum displacements of said strut from said axis.

References Cited in the file of this patent

UNITED STATES PATENTS

| | | |
|---|---|---|
| 2,257,905 | Gorrie | Oct. 7, 1941 |
| 2,396,279 | Metsger | Mar. 12, 1946 |
| 2,470,452 | Ackley | May 17, 1949 |

FOREIGN PATENTS

| | | |
|---|---|---|
| 671,337 | Great Britain | Apr. 30, 1952 |